(12) United States Patent
Liardakis

(10) Patent No.: US 7,413,255 B2
(45) Date of Patent: Aug. 19, 2008

(54) ORTHOPEDIC SITTING DEVICE

(76) Inventor: Themistoklis Liardakis, 7140 W. Grand Ave., Chicago, IL (US) 60707

( * ) Notice: Subject to any disclaimer, the term of this patent is extended or adjusted under 35 U.S.C. 154(b) by 0 days.

(21) Appl. No.: 11/467,661

(22) Filed: Aug. 28, 2006

(65) Prior Publication Data

US 2008/0048481 A1    Feb. 28, 2008

(51) Int. Cl.
*A47C 7/02* (2006.01)
(52) U.S. Cl. .................. 297/466; 297/284.9; 5/630; 5/654
(58) Field of Classification Search ............. 297/219.1, 297/284.9, 466, 467; 5/630–633, 652–655, 5/648, 655.5, 655.9, 731–734
See application file for complete search history.

(56) References Cited

U.S. PATENT DOCUMENTS

| 2,522,887 | A | * | 9/1950 | Nelson | 297/423.17 |
| 2,650,654 | A | * | 9/1953 | Twiford | 297/423.17 |
| 3,216,738 | A | * | 11/1965 | Bockus | 297/467 |
| 3,639,929 | A | * | 2/1972 | Ichise | 5/648 |
| 3,679,262 | A | * | 7/1972 | Slavitt | 297/423.17 |
| 3,863,984 | A | * | 2/1975 | Sickels | 297/423.17 |
| 4,145,082 | A | * | 3/1979 | Daly et al. | 297/466 |
| 4,969,689 | A | * | 11/1990 | Kricheldorf | 297/467 |
| 5,137,334 | A | * | 8/1992 | Cheney et al. | 297/467 |
| 7,255,396 | B1 | * | 8/2007 | Anikin et al. | 297/284.9 |

* cited by examiner

*Primary Examiner*—Peter R. Brown
(74) *Attorney, Agent, or Firm*—Trexler, Bushnell, Giangiorgi, Blackstone & Marr, Ltd.

(57) ABSTRACT

A sitting device to support a thigh of a person such as a driver of a motor vehicle or any other person desiring or requiring leg support is described. The sitting device in one embodiment comprises a base section having an inside edge and an outside edge and a top surface between said edges and a support section projecting from the top surface of the base section at the outside edge whereby the support section and the base section form an acute angle. The support section has a base and a top edge with the base joined to the top surface of the base section adjacent to its outside edge. The sitting device is preferably formed of a thermoplastic elastomer. The sitting device can have one or more cavities in the support section.

4 Claims, 2 Drawing Sheets

ORTHOPEDIC SITTING DEVICE

BACKGROUND OF THE INVENTION

This invention relates generally to support of a person's leg in a sitting position. More particularly, the invention relates to support of a driver's leg while operating a motor vehicle. Driving long distances or for long periods of time requires a driver to keep the right leg in substantially the same position for extended periods. Keeping the leg in substantially the same position for extended periods can cause a loss of sensation in the leg, leading to reduced reaction times, and can cause problems such as leg pain, knee pain, and lower back pain.

One solution has been deep driver's seats that sculpt the driver's legs on both sides. This solution causes additional problems, however, such as difficulty in getting in and out of the seat, as the driver must pull himself up a considerable distance to clear the sides of the base of the seat. This difficulty can be a safety problem if the driver needs to exit the vehicle in an emergency.

Accordingly, a need exists for a motor vehicle accessory that will support the driver's leg without the problems of the prior art. The present invention meets this need.

BRIEF SUMMARY OF THE INVENTION

The sitting device of the present invention is designed to support a thigh of a person, such as a driver of a motor vehicle or any other person desiring or requiring leg support. The sitting device in one embodiment comprises a base section having an inside edge and an outside edge and a top surface between said edges, and a support section projecting from the top surface of the base section at the outside edge. The support section has a base and a top edge, with the base joined to the top surface of the base section adjacent to its outside edge.

In other embodiments, the sitting device has one or more cavities in the support section.

BRIEF DESCRIPTION OF THE SEVERAL VIEWS OF THE DRAWINGS

The organization and manner of the structure and operation of the invention, together with further objects and advantages thereof, may best be understood by reference to the following description, taken in connection with the accompanying drawings, wherein like reference numerals identify like elements in which.

DETAILED DESCRIPTION OF THE ILLUSTRATED EMBODIMENT OF THE INVENTION

Figure 1:
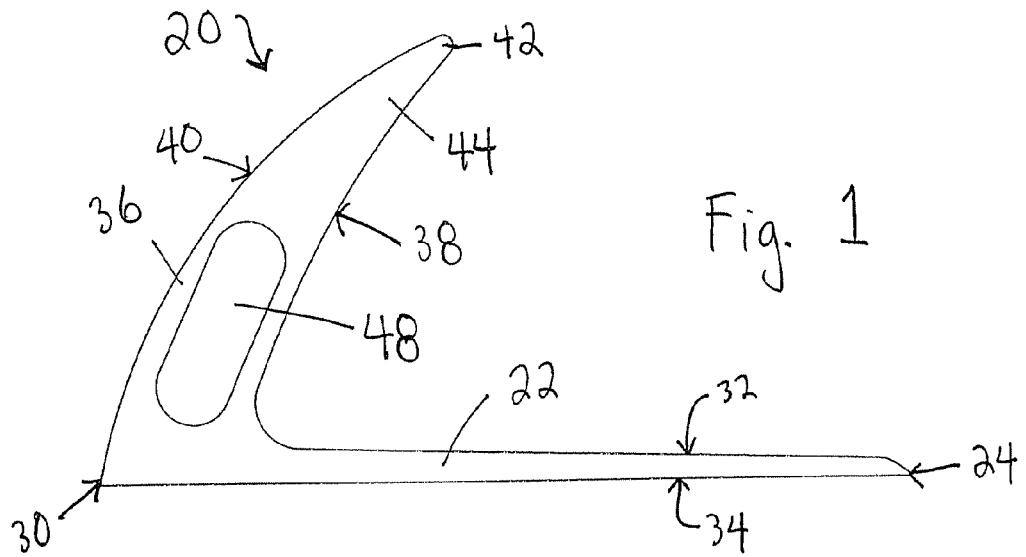
FIG. 1 is a front elevation view of the sitting device of the preferred embodiment of the present invention.

While the invention may be susceptible to embodiment in different forms, there is shown in the drawings, and herein will be described in detail, a specific embodiment with the understanding that the present disclosure is to be considered an exemplification of the principles of the invention, and is not intended to limit the invention to that as illustrated and described herein.

Figure 2:
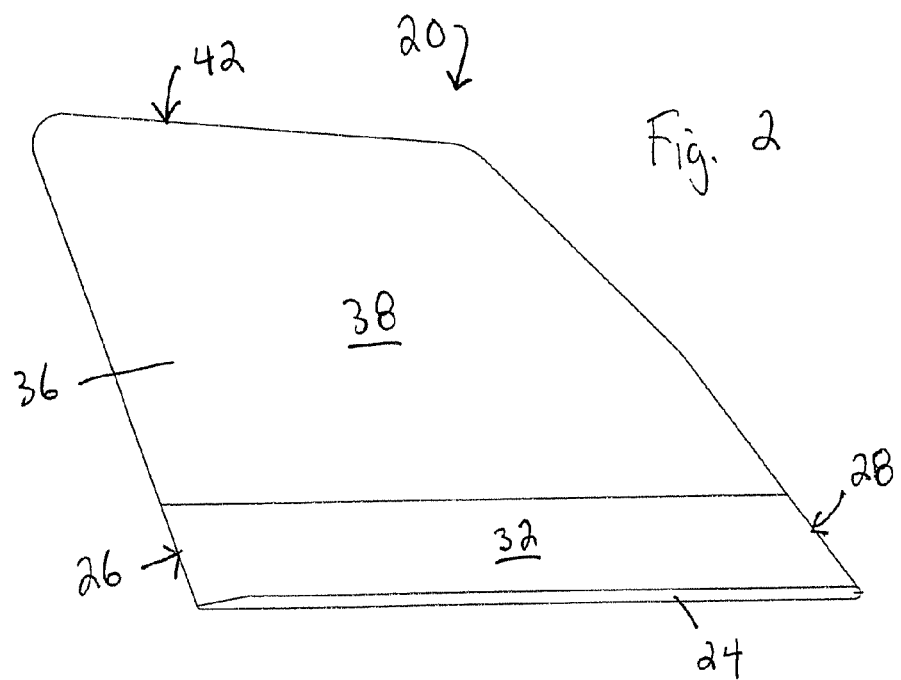
FIG. 2 is a side elevation view of the sitting device of FIG. 1.
Figure 3:
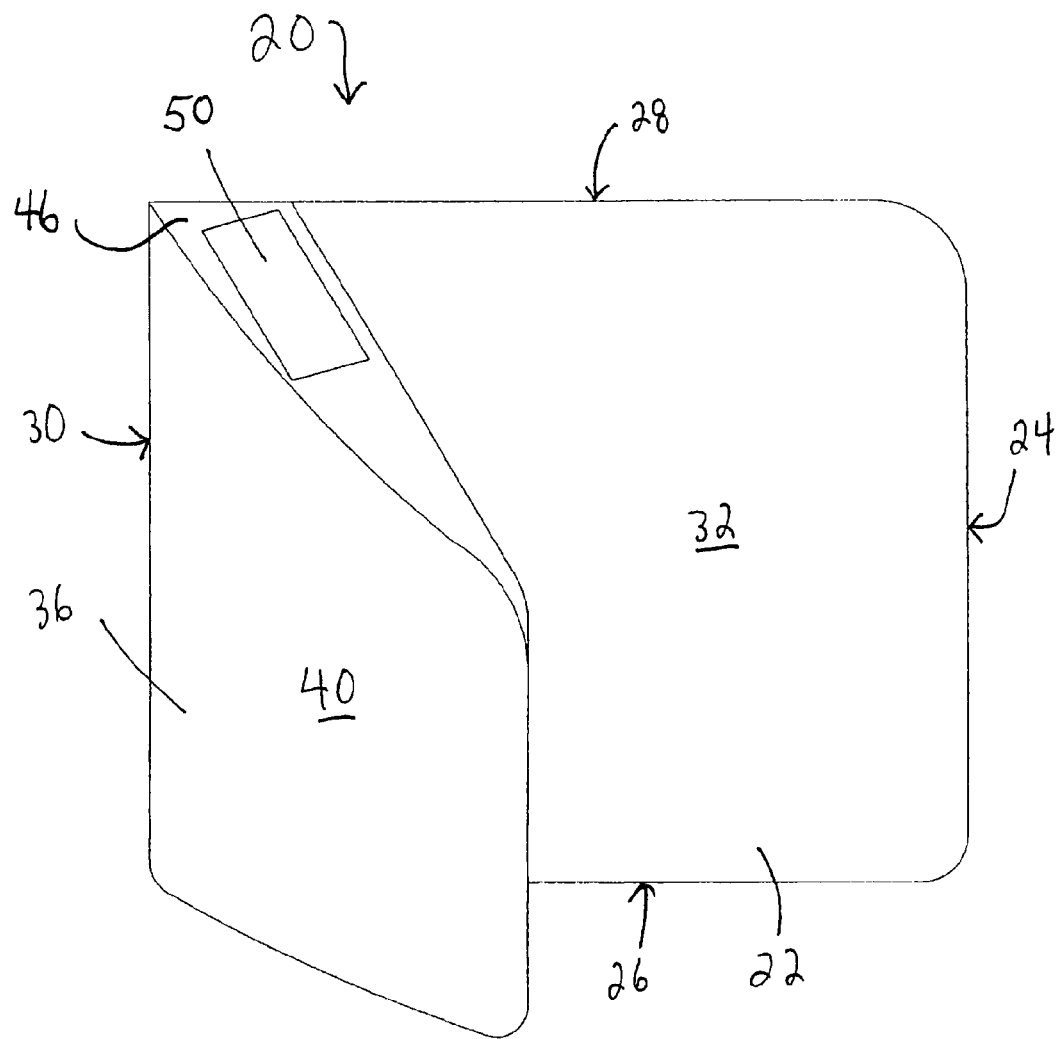
FIG. 3 is a top perspective view of the sitting device of FIG. 1.

The automobile accessory 20 of the present invention is shown in FIGS. 1 through 3. Sitting device 20 supports the leg of a driver at an approximately 90-degree angle, thereby keeping the leg from sagging to the right. Sitting device 20 will be described in a preferred size which will fit the right leg of most drivers of automobiles, trucks, recreational vehicles, buses, livery vehicles, and any other vehicle requiring a driver. However, sitting device 20 can also be manufactured in different sizes to match different sizes of drivers if desired.

Sitting device 20 has a base section 22 having an inside edge 24, a front edge 26, a rear edge 28, and an outside edge 30. These four edges 24, 26, 28, and 30 define a plane having a top surface 32 and a bottom surface 34. In the preferred embodiment, inside edge 24 and outside edge 30 are each approximately 5.5 inches and front edge 26 and rear edge 28 are approximately 6.5 inches. Base section 22 is approximately 0.25 inches thick at or near outside edge 30. Top surface 32 slopes from outside edge 30 to inside edge 24, so that the thickness of base section 22 gradually decreases in the direction of inside edge 24, which is pointed.

Support section 36 is a member projecting from top surface 32 at outside edge 30 forming an acute angle between support section 36 and base section 22. Support section 36 has a first surface 38 that is proximal to and adjoins top surface 32 and an opposing second surface 40 that is distal to top surface 32. First surface 38 and second surface 40 form a member having a cross-sectional shape, as shown in FIG. 1 that is generally of an acute triangle with the hypotenuse being gently rounded. First surface 38 is generally flat, for ease of manufacture, but can also be curved concavely.

Support section 36 has the shape, in elevation view as shown in FIG. 2, of a trapezoid. (As shown in FIG. 2, the user's knee would be to the left.) The top edge 42 of support section 36 is preferably about 3.75 inches above bottom surface 34 of base section 22.

Support section 36 has a front side 44 and a rear side 46. (Front side 44, in use, will be closed to the user's right knee.) A front cavity 48 is formed from front side 44 into the interior of support section 40. A rear cavity 50 is formed from rear side 46 into the interior of support section 40. Front cavity 48, as illustrated, has rounded edges, while rear cavity 50, as illustrated, has corners. Both cavities 48, 50 could be rounded or both could have sharp corners or another shape could be used. Preferably, each cavity 48, 50 extends partially into the body of support section 40, but a single bore extending completely through from front side 44 to rear side 46 could be used.

Support section 40 can be made without cavities 48, 50. These cavities 48, 50, however, besides saving on material costs, serve to disperse heat and accordingly keep sitting device 20 cooler than if support section 40 was solid. Cavities 48, 50 also serve to increase the flexibility of support section 40, so that it will conform more easily to the shape of the user's leg.

Sitting device 20 is preferably manufactured by injection molding, preferably using a thermoplastic elastomer, such as the material sold under the trade name Neoprene ® or Santoprene™. A rigid material could be used, but the flexibility of the thermoplastic elastomer allows sitting device 20 to form to the driver's leg and accordingly adjusts for different sizes of drivers.

In use, base section 22 of sitting device 20 is placed under the right thigh of a driver of a vehicle, with support section 40 conforming to the outside of the right thigh of the driver. Sitting device 20 holds the driver's right leg at an approximately 90-degree angle, preventing sag to the outside. Accordingly, the right leg is less likely to lose sensation after a long period of driving and late response to the brake or accelerator pedals is reduced. Additionally, a driver with pulled tendons, torn cartilage, tendonitis, bursitis, knee pain, sciatic pain, sprained or pulled ligaments, or other afflictions of the leg or lower back, will find relief from the support provided by sitting device 20. Moreover, because a driver will normally use sitting device 20 only on the right leg, there is no impediment to exiting the driver's seat on the left side.

Sitting device 20 can also be used for leg support in non-driving conditions, such as in a wheelchair or while recuperating from an injury that requires elevation of the leg. In these situations, sitting device 20 can be used on either or both legs, or a mirror image of the illustrated embodiment can be made for use on the left leg.

While a preferred embodiment of the present invention is shown and described, it is envisioned that those skilled in the art may devise various modifications of the present invention.

I claim:

1. A sitting device for supporting a thigh of a person comprising:

a base section comprising a generally rectangular member having an inside edge, an outside edge, a front edge, a rear edge, a top surface, and a bottom surface; and a support section projecting from said top surface, said support section comprising a first surface and a second surface, said first surface being proximal to said top edge of said base section, said second surface being opposed to said first surface, a first side of said first surface meeting said top surface of said base section, a second side of said first surface meeting a first side of said second surface at a top edge of said support section, a second side of said second surface meeting said base section along substantially all of said outside edge of said base section, said second surface of said support section being curved inward toward said top surface of said base section.

2. The sitting device of claim 1, wherein said support section has a first surface proximal to said top section and a second surface distal to said top section and said second surface is curved.

3. The sitting device of claim 1, further comprising a cavity in said support section.

4. The sitting device of claim 1, wherein said device comprises a thermoplastic elastomer.

* * * * *